US005692212A

United States Patent [19]
Roach

[11] Patent Number: 5,692,212
[45] Date of Patent: Nov. 25, 1997

[54] INTERACTIVE MULTIMEDIA MOVIES AND TECHNIQUES

[76] Inventor: Richard Gregory Roach, 12840 SE. 3rd St., Bellevue, Wash. 98005

[21] Appl. No.: 263,856

[22] Filed: Jun. 22, 1994

[51] Int. Cl.⁶ .............................. G06F 3/100; A63F 9/22
[52] U.S. Cl. ........................ 395/806; 395/173; 273/434
[58] Field of Search ................................. 395/152, 153, 395/154, 155, 173, 806, 807; 273/434, 437

[56] References Cited

U.S. PATENT DOCUMENTS

| | | | |
|---|---|---|---|
| 4,305,131 | 12/1981 | Best | 395/152 |
| 4,445,187 | 4/1984 | Best | 395/152 |
| 4,569,026 | 2/1986 | Best | 395/152 |
| 5,111,409 | 5/1992 | Gasper et al. | 395/154 |
| 5,274,758 | 12/1993 | Beitel et al. | 395/154 |
| 5,358,259 | 10/1994 | Best | 273/434 |

*Primary Examiner*—Heather R. Herndon
*Assistant Examiner*—Cliff N. Vo
*Attorney, Agent, or Firm*—Wendy K. Buskop; Chamberlain, Hrdlicka, et al

[57] ABSTRACT

A user/PC interface is described that enables the user to interact with, and control, in part, the display and sequence of multimedia information. Techniques provided include presenting dialog lines for computer users and gateways for entering alternate storylines. Additional techniques are presented for conveying information related to a character's thoughts, memories and background. Icons are presented to signal the presence of additional storyline information. Other icons allow the user to become an interactive movie character in order to draw the user into the flow of the storyline and impart the experience of "having been there."

11 Claims, No Drawings

INTERACTIVE MULTIMEDIA MOVIES AND TECHNIQUES

BACKGROUND OF THE INVENTION

This invention relates to conveying an interactive story by use of a computer.

The conveying of information via computers is a new field. One of the ways in which this new field is different from old methods of conveying information, such as books, movies, television, and video and sound recordings, is in the ability of the user to interact with the information source. Also, accessing particular items of information is nearly instantaneous using the new technology.

Little has been done using conventional movie techniques to perform audiovisual works from a first person perspective. So little has been done that interactive movies are largely a new art form. Permitting the user to access alternate storylines, to receive information outside of the main storyline, to access a character's thoughts and memories, are all capabilities that need to be developed in order to popularize this new technology.

OBJECTS OF THE INVENTION

It is an object of this invention to provide a technique for permitting a computer user to engage in dialogue with a character in an audiovisual work.

It is another object of this invention to provide an audiovisual work that has alternate storylines.

It is another object of this invention to provide a technique for permitting a computer user to enter alternate storylines for an audiovisual work.

It is another object of this invention to provide interactive movie techniques for conveying information to a computer user relating to character's thoughts and memories, from a first person perspective.

It is another object of this invention to provide a technique for permitting a user to access additional information pertaining to a storyline without loss of continuity of the storyline.

SUMMARY OF THE INVENTION

In one embodiment of the invention there is provided a computer memory device. The memory device causes a computer to convey a branch of a storyline to a computer user who is playing a participant's part in the storyline. The branch of the storyline is output from the computer through an audio interface and visual interface operatively associated with the computer. The branch begins with a first dialogue line conveyed to the user by an actor though the audio interface and the visual interface. The user is provided with response options to the first dialogue line. A second dialogue line is output by the computer through the audio interface based on the user's selected response option. The second dialogue line is predetermined based on the response option selected by the user. A third dialogue line is then conveyed to the user by the actor through the audio interlace and the visual interface. The third dialogue line is predetermined based at least in part on the response option selected by the user. The computer memory device has recorded thereon the data and instructions necessary to carry out this exchange. Digital information is necessary to generate the visual and audio outputs. The necessary information is provided by a digital database having a first portion representing a first image of the actor a second portion representing the first dialogue line, a third portion representing response options to the first dialogue line, a fourth portion representing the second dialogue line, a fifth portion representing a second image of the actor, and a sixth portion representing the third dialogue line. The instructions recorded on the computer memory device include instructions for causing the computer to output, through the visual interface the first image of the actor from the first portion of the digital database. instructions for causing the computer to output, through the audio interface, the first dialogue line from the second portion of the digital database, instructions for causing the computer to output, through the visual interface, a plurality of response options to the first dialogue line from the third portion of the digital database, instructions for causing the computer to receive and process a selected desired response option input to the computer by the user, instructions for causing the computer to output, through the audio interface, the second dialogue line responsive to the response option selected by the user from the fourth portion of the digital database, instructions for causing the computer to output, through the visual interface, the second image of the actor from the filth portion of the digital database, and instructions for causing the computer to output, through the audio interface, the third dialogue line from the sixth portion of the digital database.

In another embodiment of the invention, the above described computer memory device is made by recording the above noted data and instructions on the computer memory device.

In another embodiment of the invention, a user uses a computer memory device, such as the one previously described, to cause a computer to convey a branch of a storyline to the user. The computer is provided with audio and visual interfaces and a reader for the memory device. The user causes the computer to output, through the visual interlace, a first image of the actor. The computer is then caused to output, through the audio interchanger, the first dialogue line. A plurality of response options to the first dialogue line are then output through the visual interface. The user selects a desired response option. The computer then outputs through the audio interface the second dialogue line responsive to the response option selected by the user. The second dialogue line reflects the user's response to the first dialogue line. The computer then outputs, through the visual interface, a second image of the actor, and through the audio interlace, the third dialogue line. Preferably, the second image is in the form of a video image or video segment.

The third dialogue line is determined at least in part by the user's selected response option. In one embodiment of the invention, there is provided a plurality of possible third dialogue lines, and one is sclected for output based in part on the response option selected by the user and in part based on earlier options selected by the user.

In another embodiment of the invention, a computer is used to convey character information relating to a character in an audiovisual work. The information is conveyed by the background scene for the character. The background scene is computer generated. The computer is provided with a digital database which can be processed by the computer to produce the desired scene. The image of the character is superimposed on the computer generated background. Abstract design and color schemes form highly effective backgrounds to affect the user's perceptions of the character of the actor. The technique is highly effective in a windowed environment.

In another embodiment of the invention, a computer is used to convey information which is optional to a main storyline being output as an audiovisual work from a computer. The information is output without loss of continuity of the main storyline. The method is carried out by causing the computer to output the audiovisual work through audio and visual interfaces. At certain times during the output, the computer is caused to display an information icon. The information icon is associated with information which is optional to the main storyline and is stored in a computer memory device which forms a database operatively associated with the computer. The user is provided with the option of causing the computer to access and output the information stored in association with the icon. To preserve the continuity of the storyline, the output of the main storyline is paused upon receipt of the access command from the user. Upon completion of output of the information stored in association with the icon, the computer continues the output of the main storyline. The technique is highly effective when used to output optional storyline for information, such as object details, character thoughts, and conversation inputs from other characters. The icon technique may also be used to provide the user with a command to move to a new physical location in the storyline.

Interactive movies provide an excellent medium for conveying a story from a first person perspective. Traditional movie techniques are not highly effective for conveying a story from a first person perspective or for conveying visual information relating to a character's thoughts or memories. In another embodiment of the invention, there is provided a method for using a computer to convey information relating to a character's thoughts. A double exposure effect is used. The computer caused to output a first scene to the computer user through the visual interface. A second scene representing the character's thoughts is simultaneously output through the visual interface. The output characteristics, such as brightness, of the first scene and second scene are determined so that the output of the first scene visually dominates the output of the second scene. If desired, the second scene can be output as a window in the visual output in the first scene, with or without the double exposure effect In another embodiment of the invention, the dialogue is caused to jump from window to window. A visual image of the actor appears in a first window on the visual interface. The computer is caused to output, through the audio interface, a first dialogue line. The output of the first dialogue line is coordinated with the speaking movements of the actor in the first window. A visual image of the actor is caused to appear in a second window on the visual interface. The computer is then caused to output, through the audio interface, the second dialogue line, in coordination with the speaking movements of the actor. The second dialogue line follows the completion of the first dialogue line. The effect is striking, especially when used to output emotional exchanges between characters taking part in the storyline. In another aspect of this embodiment, the user enters the exchange of dialogue lines. The actor delivers the first dialogue line, the user selects and causes the computer to output through the audio interface the second dialogue line, and the actor delivers a responsive third dialogue line. Preferably, the first visual image of the actor is paused after the actor delivers the first dialogue line.

DETAILED DESCRIPTION OF THE PREFERRED EMBODIMENTS

In one embodiment of the invention, there is provided a computer memory device. An example of a suitable memory device is a CD-ROM disc. The memory device causes a computer to convey a branch of a storyline to a computer user who is playing a participant's part in the storyline. The branch of the storyline is output from the computer through an audio interface and visual interface operatively associated with the computer. The computer is also operably associated with a reader for the memory device and a suitably sized internal memory to accommodate the data flow from the reader.

The branch of the storyline begins with a first dialogue line conveyed to the user by an actor though the audio interface and the visual interface. The user is provided with response options to the first dialogue line. Options can be displayed as written responses appearing in a box on the visual interlace, or in the forms icons depicting emotional responses, for example. A second dialogue line is output by the computer through the audio interface based on the user's selected response option. The second dialogue line is predetermined based on the response option selected by the user. The second dialogue may or may not replicate the written form. Greater user interaction is stimulated when the audio does not precisely track the written response. A third dialogue line is then conveyed to the user by the actor through the audio interface and the visual interface. The third dialogue line is predetermined based at least in part on the response option selected by the user.

The computer memory device has recorded thereon the data and instructions necessary to carry out this exchange. Digital information is necessary to generate the visual and audio outputs. The necessary information is provided by a digital database having a first portion representing a first image of the actor, a second portion representing the first dialogue line, a third portion representing response options to the first dialogue line, a fourth portion representing the second dialogue line fifth portion representing a second image of the actor, and a sixth portion representing the third dialogue line. The instructions recorded on the computer memory device include instructions for causing the computer to output, through the visual interface, the first image of the actor from the first portion of the digital database, instructions for causing the computer to output, through the audio interface, the first dialogue line from the second portion of the digital database, instructions for causing the computer to output, through the visual interface, a plurality of response options to the first dialogue line from the third portion of the digital database, instructions for causing the computer to receive and process a selected desired response option input to the computer by the user, instructions for causing the computer to output, through the audio interlace, the second dialogue line responsive to the response option selected by the user from the fourth portion of the digital database, instructions for causing the computer to output, through the visual interface, the second image of the actor from the fifth portion of the digital database, and instructions for causing the computer to output, through the audio interlace, the third dialogue line from the sixth portion of the digital database. The steps to record the necessary information on the computer memory device are known. The storyline, or lines, are preferably scripted so that the outputs from the interface follow a predetermined sequence for the various lines.

In another embodiment of the invention, the above described computer memory device is made by recording the above noted data and instructions on the computer memory device. This produces a product which can be distributed to end users.

In another embodiment of the invention, a user uses a computer memory device, such as the one previously described, to cause a computer to convey a branch of a storyline. The computer is provided with audio and visual interfaces and a reader for the memory device. The user causes the computer to output, through the visual interface, a first image of the actor. The computer is then caused to output through the audio interface, the first dialogue line. A plurality of response options to the first dialogue line are then output through the visual interface. The user selects a desired response option. The computer then outputs through the audio interface the second dialogue line responsive to the response option selected by the user. The second dialogue line reflects the user's response to the first dialogue line. The computer then outputs, through the visual interface, a second image of the actor and through the audio interface, the third dialogue line. The second dialogue line is preferably delivered in the voice of the central character through whom the user is controlling the movie.

The third dialogue line is determined at least in part by the user's selected response option. In one embodiment of the invention, there is provided a plurality of possible third dialogue lines, and one is selected for output based in part on the response option selected by the user and in part based on earlier options selected by the user. For example, where the user has consistently selected angry responses, the third dialogue line can be selected to be combative. A mechanism for changing the path of the storyline based on the user response pattern is thus provided according to this embodiment.

In one embodiment, the user's response choices are used to change the tenor of the movie line. An emotional value, such as anger, openness, evasiveness, etc., termed an "uber" value. is assigned to at least a portion of the responses made by the user. These values have a value assigned to them, and their cumulative value is tracked. For example, an angry response can be assigned an uber value of 1, an open response can be assigned an uber value of 2, and a guarded response can be assigned an uber value of 3. Where the cumulative value of these responses is low, for example, it indicates that the user has selected consistently angry responses, and the third dialogue line and accompanying visual output can be selected which is appropriate for an angry user. Music and color schemes can accompany the third dialogue line which are appropriate for its content. The music and color schemes can be preselected or they can be synthesized by the computer from music and color scheme databases provided on the computer memory device.

In another aspect of this embodiment of the invention, the computer is caused to output, through the visual interlace, a computer generated location scene. Preferably, the scene appears from the perspective of the user. The images of the actor are superimposed over the computer generated location scene. This effect can be produced by shooting the actors against a blue screen, digitizing the resulting video, and applying the digitized video to the computer generated location scene. If desired, the images of the actors can be output through windows formed on the visual interface.

In another embodiment of the invention, a computer is used to convey character information relating to a character in an audiovisual work. The information is conveyed by an abstract background scene for the character. The background scene is preferably computer generated, although a photograph having the desired background scene could be scanned into the computer database if desired. The computer is provided with a digital database which can be processed by the computer to produce the desired scene. The image of the actor playing the part of the character in superimposed on the computer generated abstract background. Abstract design and color schemes form highly effective backgrounds to affect the user's perceptions of the character of the actor. The technique is highly effective in a windowed environment. When carried out in this fashion, the scene appears in a window which is output on the visual interface. The background can change during the course of the storyline, as the user's perceptions change, or at least some of the characteristics of the background can remain constant and unchanging, thus providing a motif for the character. Suitable designs include solar or atomic symbols, polygons, and puzzles, for example.

In another embodiment of the invention, a computer is used to convey information which is optional to a main storyline being output as an audiovisual work from a computer. The information is output without loss of continuity of the main storyline. The method is carried out by causing the computer to output the audiovisual work through audio and visual interfaces. At certain times during the output, the computer is caused to display an information icon. The information icon is associated with information which is optional to the main storyline and is stored in a computer memory device which forms a database operatively associated with the computer. The user is provided with the option of causing the computer to access and output the information stored in association with the icon. To preserve the continuity of the storyline, the output of the main storyline is paused upon receipt of the access command from the user. Upon completion of output of the information stored in association with the icon, the computer continues the output of the main storyline. The technique is highly effective when used to output optional storyline information, such as object details, character thoughts and conversation inputs from other characters. The icon technique may also be used to provide the user with a stored command to move to a new physical location in the storyline. For example, the icon can represent a "go to" command such as "Go to help Able." Upon actuation, the user will experience of moving from a first physical location to a second physical location in the story, and the storyline will change to an alternate version. In another embodiment of the invention, the icon may be used to store a retrievable query by the user. For example, the query may be "Where is Able?" Suitable means, such as a cursor, are provided so that the user can direct the query at a character appearing on the interface actuate the query, receive an output of the query in audio form access the database associated with the query icon, and receive an audiovisual response to the query. One technique by which the query can be activated is by the use of the cursor. The user causes the cursor to move on the visual interface. The computer is caused to display the information icon in active form on the visual interface in response to the cursor being moved into a predetermined area on the visual interface, such as in registry with the icon. In one embodiment, the cursor can be used to drag the icon to a target area, and then causing the computer to access the associated database.

Interactive movies provide an excellent medium for conveying a story from a first person perspective. Traditional movie techniques are not highly effective for conveying a story from a first person perspective or for conveying visual information relating to a character's thoughts or memories. In another embodiment of the invention, there is provided a method for using a computer to convey information relating to a character's thoughts. A double exposure effect is used. The computer caused to output a first scene to the computer user through the visual interface. The first scene can depict the character's thoughts, or the character's physical location, for example. A second scene representing the character's thoughts is simultaneously output through the visual interlace. The output characteristics, such as brightness, of the first scene and second scene are determined so that the output of the first scene visually dominates the output of the second scene. If desired, the second scene can be output as a window in the visual output in the first scene, with or without the double exposure effect. The scenes can be premixed and stored on the computer memory device in premixed form, or the scenes can be separately stored on the computer memory device and blended on the fly by providing suitable computer instructions. The scenes can be blended to convey emotion, such as confusion, for example.

In another embodiment of the invention, the dialogue is caused to jump from window to window. A visual image of the actor appears in a first window on the visual interface. The computer is caused to output, through the audio interface, a first dialogue line. The output of the first dialogue line is coordinated with the speaking movements of the actor in the first window. A visual image of the actor is caused to appear in a second window on the visual interface. The computer is then caused to output, through the audio interface, the second dialogue line, in coordination with the speaking movements of the actor. The second dialogue line follows the completion of the first dialogue line. Preferably, the first visual image of the actor is paused after the actor delivers the first dialogue line. The effect is striking, especially when used to output emotional exchanges between characters taking part in the storyline. The technique also overcomes the continuity problems associated with interactive movies according to prior art techniques. In another aspect of this embodiment, the user enters the exchange of dialogue lines. The actor delivers the first dialogue line, the user selects and causes the computer to output through the audio interface the second dialogue line, and the actor delivers a responsive third dialogue line. Full screen outputs of the first visual image and the second visual image are effective when the user is involved in the dialogue. Using a computer generated abstract background the actors is preferred.

I claim:

1. A method for using a computer to convey information which is optional to a main storyline to a computer user receiving an audiovisual work having a main storyline from the computer through an audio interface and a visual interface operatively associated with the computer, without loss of continuity of the main storyline, said method comprising:

causing the computer to output the audiovisual work from the computer through the audio interface and the visual interface;

causing the computer to display an information icon on the visual interface to the user during the output of the audiovisual work from the computer, said information icon being associated with information which is optional to the main storyline and which is stored in a database operatively associated with the computer;

causing the computer to access the information stored in association with the icon;

causing the computer to pause the output of the main storyline upon receipt of the command;

causing the computer to output the information associated with the information icon; and causing the computer to continue the output of the main storyline upon completing the output of the optional information without loss of continuity of the main storyline.

2. A method as in claim 1 further comprising providing the user with a cursor and a means for causing the cursor to move on the visual interface, wherein the computer is caused to display the information icon on the visual interface in response to the cursor being moved into a predetermined area on the visual interface.

3. A method as in claim 1 wherein the information icon comprises a query icon, said method further comprising providing the user with a cursor and a means for causing the cursor to move on the visual interface, causing the computer to activate the query icon in response to the cursor moving into registry with the query icon, moving the cursor into a target area for the query on the visual interface, and causing the computer to output the query through the audio interface, wherein the computer accesses the information stored in association with the query icon after outputting the query through the audio interface.

4. A method as in claim 3 where the computer outputs the information stored in association with the query icon through the audio interface.

5. A method as in claim 1 wherein the information icon comprises a "go to" icon, and the information stored in association with the icon gives the user the perception of moving through physical space from a first location to a second location.

6. A method as in claim 1 wherein the icon is selected from the group consisting of a conversation icon, a detail icon, and a thought icon, wherein the conversation icon is associated with a database containing a character's lines; the detail icon is associated with a database containing additional visual information about an object appearing on the visual interface; and the thought icon is associated with a database containing information relating to a character about information received through at least one of the visual and audio interfaces.

7. A method for using a computer to convey information relating to a character to a computer user receiving a storyline from the computer in the form of an audiovisual work through an audio interface and a visual interface operatively associated with the computer, wherein the information relating to the character form a part of the storyline, said method comprising causing the computer to output a first scene to the computer user through the visual interface, said first scene being output through the visual interface at a first set of output characteristics; and causing the computer to simultaneously output to the computer user through the visual interface a second scene which represents the information relating to the character, said second scene being output to the computer user at a second set of output characteristics, creating a double exposure effect;

wherein the first set of output characteristics and the second set of output characteristics are predetermined so that the output of the first scene visually dominates the output of the second scene.

8. A method as in claim 7 wherein the first scene represents the information relating to the character.

9. A method as in claim 7 wherein the first scene represents the character's physical location.

10. A method for using a computer to convey information related to a character to a user of the computer in a storyline being conveyed to the user as an audiovisual work through an audio interface and a visual interface operatively associated with the computer, said storyline comprising in sequence a first dialogue line conveyed to the user by an actor through the audio interface and the visual interface, a second dialogue line which represents the information related to the character following the first dialogue line output by the computer through the audio interface, and a third dialogue line conveyed to the user by the actor through the audio interface and the visual interface, said method comprising:

causing the computer to output, through the visual interface, a first visual image of the actor in a first window;

causing the computer to output, through the audio interface, the first dialogue line;

causing the computer to output, through the audio interface, the second dialogue line;

causing the computer to output, through the visual interface, a second visual image of the actor in a second window, said second window appearing simultaneously with the first window;

causing the computer to pause the first visual image of the actor; and causing the computer to output, through the audio interface, the third dialogue line.

11. A method as in claim 10 further comprising causing the computer to output, through the visual interface, a location scene from the perspective of the user:

wherein the first window is superimposed over the location scene; and wherein the second window is superimposed over the location scene.

\* \* \* \* \*